United States Patent Office 2,725,660
Patented Dec. 6, 1955

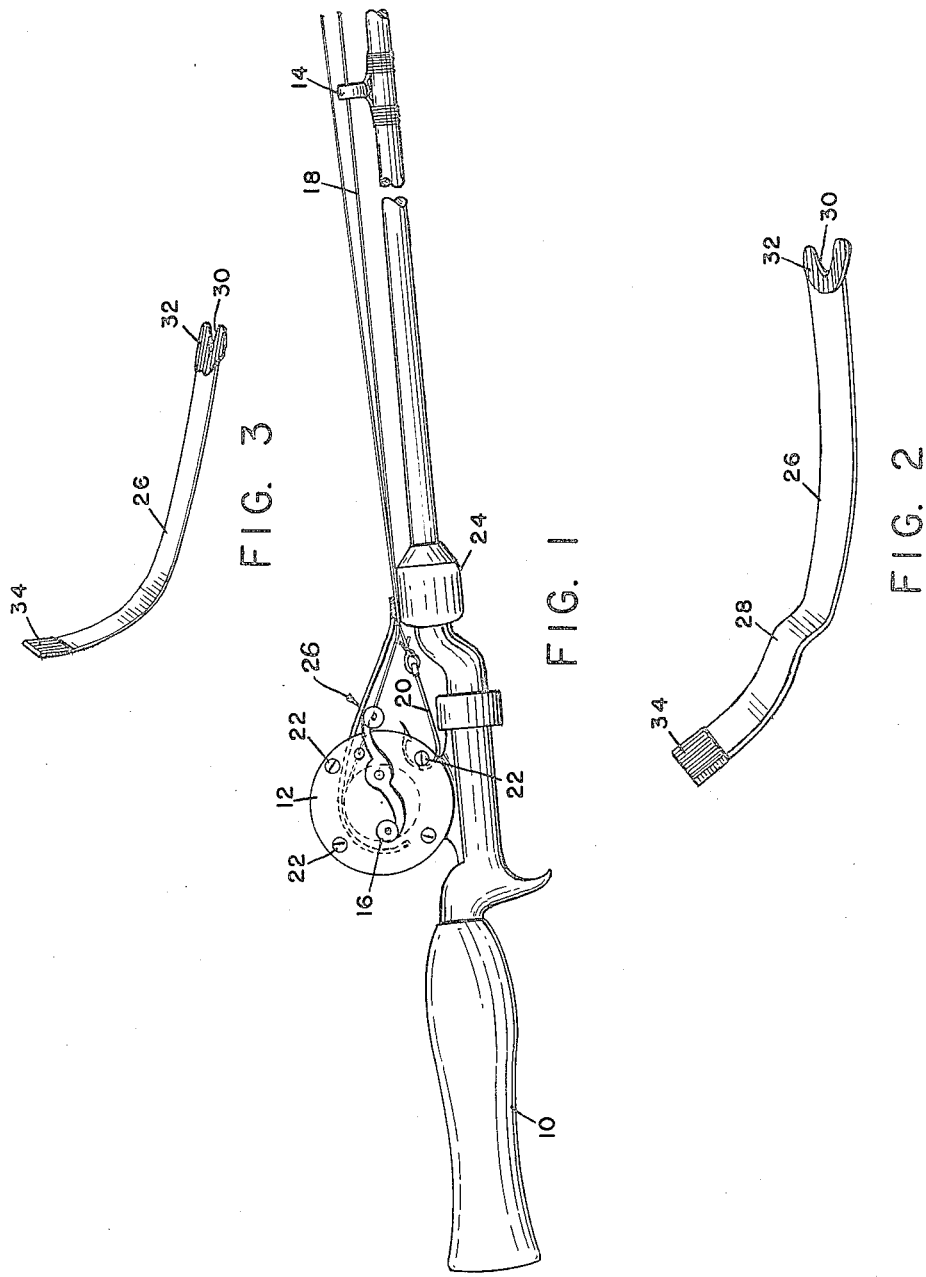

2,725,660

ACCESSORY FOR FISHING ROD AND REEL

Len Costley, South International Falls, Minn.

Application October 26, 1953, Serial No. 388,148

3 Claims. (Cl. 43—25)

This invention relates to a device which is to be associated with fishing rod and reel and particularly to an accessory which will prevent movement of the reel when the equipment is being carried or transported.

An object of the invention is to provide means which will permit the rod and reel from getting their line tangled while being transported to and from the fishing area and at the same time hold the line so that the hook may be kept secure in an inactive position.

Another object of the invention is the provision of an accessory for a fishing rod equipped with a reel and line for holding the reel from turning and at the same time hold the line taut when not in use so that in the event the line should be caught on some object it will not be drawn from the reel.

Other and further objects of the invention and the advantages of the same will be pointed out hereinafter and indicated in the appended claims or will be obvious to one skilled in the art upon understanding the present disclosures.

While two embodiments of the invention have been disclosed and shown in the drawings in more or less detail to comply with the requirement of the statute, it is desired that these detailed drawings be considered merely as illustrative and not as limitations and it also is to be understood by those skilled in the art that modifications may be made without departing from the invention especially as defined in the pending claims.

In the above drawing which illustrates the present invention, in which like numerals refer to like parts, Figure 1 is a perspective view of the rod and reel with parts broken away and with the accessory in position;

Figure 2 is a view of the preferred form of the accessory; and

Figure 3 is a view of a modified form of the accessory.

When fishing with a rod equipped with a reel it is common for the user, when his fishing activities are interrupted, to engage a hook on the end of the line with the reel and to wind the reel until the line is taut. Usually the brake of the reel is set so as to resist unwinding of the reel should the line be caught on some object in such a manner as to withdraw the line from the reel. It is also common occurrence for a fisherman, when transferring his fishing activities from one position to another, to similarly arrange his line and hook. Under such conditions, walking or otherwise moving from one position to another, the line may become caught on a tree, branch or other foreign object and unwind the line from the reel often causing the hook to become free from the reel and to catch on other objects such as the fisherman himself. It is often a common occurrence to stack the rods and reels in a suitable conveyance when traveling to and from the fishing area. Under such circumstances the line may become tangled. The primary purpose of this invention is to provide an exceedingly simple device whereby the disadvantages above pointed out are overcome.

Referring to the drawings in detail, there is shown a fishing rod having a handle 10 at one end with a reel 12 suitably mounted thereon. Attached to the handle is the rod which is equipped with the usual guides 14 (only one being shown). The reel which may be of the normal type which includes a spindle and a pair of side plates connected together by post 22 is mounted on the handle 10 and is provided with a suitable operating handle 16. The line 18 is mounted upon the reel 12 and extends through the guide 14 and is secured to a suitable fishing device such as a hook 20. The hook 20 is shown in the drawings as being in the inactive position and fastened to one of the posts 22 of the reel 12.

It is, of course, not necessary that the hook be secured to a post of the reel when in the inactive position. The hook may be fastened to the handle 10 or any other suitable place as long as the line 18 is held under tension when the accessory is in place. After the hook 20 is secured to the handle or the reel, the reel operating handle 16 is turned to place the line 18 under tension. The normal arrangement, commonly resorted to by fishermen when they temporarily or otherwise discontinue their fishing activities and do not wish to disassemble the rod and reel, is to secure the hook to the handle or reel and turn the operating handle until the line is taut, but with this arrangement should the line catch upon some foreign object the reel is caused to turn and the line likely to become entangled.

In accordance with the present invention, a narrow strip 26 of spring steel or its equivalent material which is formed into a reel and line holder member of the type shown in Figures 2 and 3 is employed. The narrow, elongated, curved strip 26 must have sufficient springiness so that it will contact the rod or the member 24, used to connect the rod to the handle, with force enough to hold the line clamped thereagainst. The member 26 is formed of a width less the height of the post 22 and is inserted under the post 22 of the reel so that one end contacts the line upon the reel while the other end contacts the rod. The curved member 26 will contact at least one post of the reel as shown in Fig. 2. If desired, the member 26 may be formed with an offset or bent portion 28 as illustrated in Fig. 3 which rests against a post 22 and prevents the tendency of member 26 to move sideways. It has been found desirable that the end of the elongated member 26 be provided with protective material 32 and 34 to prevent damaging of the line 18. This protective material may be rubber, adhesive tape, plastic coating, or in fact, any suitable material that prevents fraying of the line. The end of the member 26 which contacts the rod generally should be provided with a notch 30 which corresponds to the configuration of the rod such as shown in Figures 2 and 3.

The member 26 is bent to form an arc of a circle. The arc of the circle should generally be not less than 40° or exceed about 130°.

It will be appreciated from the foregoing that the device of the present invention is relatively simple, readily applied and removed from the rod and reel assembly and by its use the associated line may be maintained under tension when not in use and it will aid in preventing tangling of the line with foreign objects or at least the disadvantageous results of such tangling. Furthermore, the accessory is economical to manufacture, easy to use and convenient to carry.

What is claimed is:

1. A combination fishing rod and reel attachment adapted to be used with a rod and a fishing reel and of the type which includes a spindle on which a line is wound and a pair of side plates interconnected by a plurality of posts, said attachment comprising an arcuated strip of resilient material having an offset portion adjacent one end thereof, said offset portion being inserted between the posts and the spindle of said reel with the line wound thereon in such a manner as to have one surface adapted to contact the posts and its opposite surface adapted to contact the line on spindle and thereby retard rotation of the spindle, and with the other free end of such said attachment projecting outwardly from said reel and adapted to bear against the rod to clamp a portion of the line extending from said reel in a desired position against said rod.

2. A fishing rod attachment as set forth in claim 1 wherein the other free end of said attachment is notched and shaped to correspond to the configuration of the rod.

3. A fishing rod attachment as set forth in claim 1 wherein the ends of said attachment are provided with protective material.

References Cited in the file of this patent

UNITED STATES PATENTS

| | | |
|---|---|---|
| 1,227,273 | King | May 22, 1917 |
| 1,542,628 | Mason et al. | June 16, 1925 |
| 2,333,632 | Bensen | Nov. 9, 1943 |